Jan. 17, 1933.  G. W. CRABTREE  1,894,757
VEHICLE SPRING CLIP
Filed Oct. 10, 1930
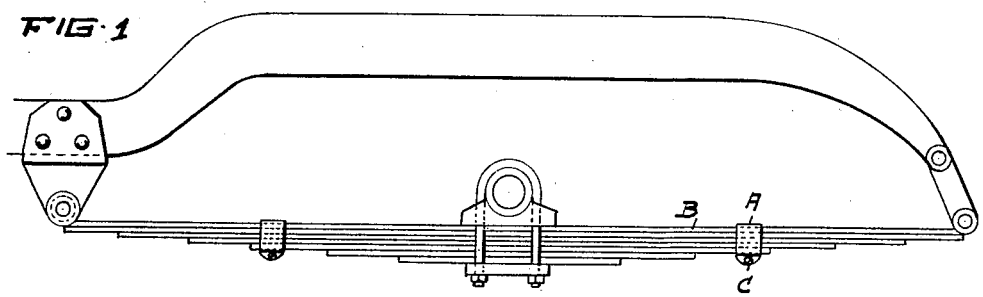
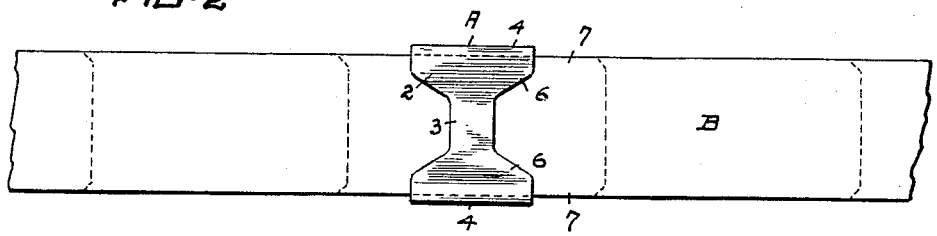
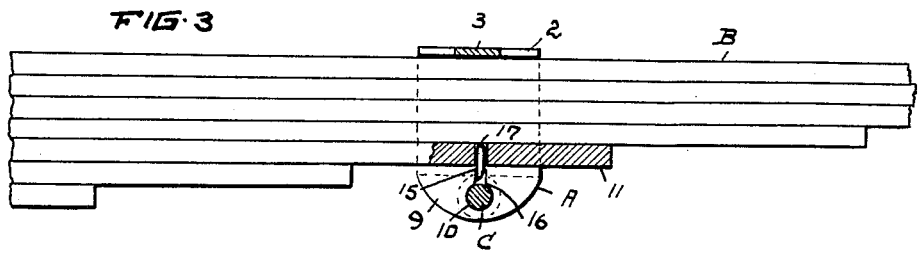
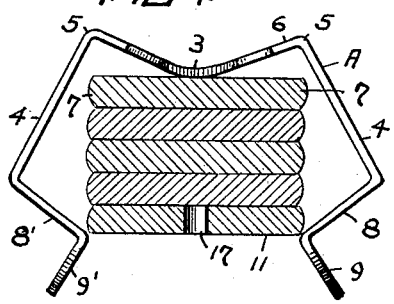
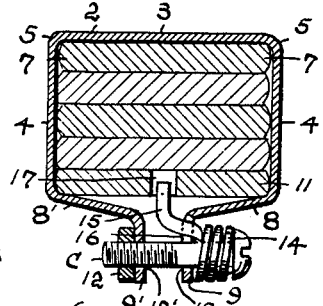
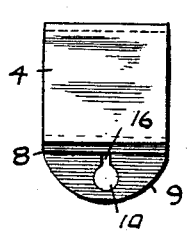
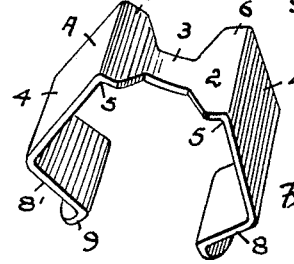
INVENTOR
GEORGE W. CRABTREE
Fisher, Moser + Moore
ATTORNEY

Patented Jan. 17, 1933

1,894,757

UNITED STATES PATENT OFFICE

GEORGE W. CRABTREE, OF CLEVELAND HEIGHTS, OHIO

VEHICLE SPRING CLIP

Application filed October 10, 1930. Serial No. 487,655.

This invention pertains to laminated vehicle springs, and more particularly to a new and novel clip for securing the leaves or laminations of a vehicle spring together, all as set forth hereinafter in greater detail and more concisely pointed out in the claims. Thus, the present clip is especially designed and constructed to permit its attachment readily and conveniently to a leaf spring, and also to be as readily removed therefrom, all without dismantling the spring itself or disconnecting the spring from its shackles. The clip also includes means for anchoring or connecting it to one of the spring leaves so that it may be fixed in a predetermined position thereon and still permit the leaves to creep or move relatively to each other when the spring is flexed.

Reference may be had to the accompanying drawing for a preferred embodiment of the invention, Fig. 1 showing a side view of a leaf spring shackled to the side member of a chassis frame and provided with a pair of clips constructed according to my invention. Fig. 2 is an enlarged top view of the clip affixed to a section of a leaf spring, and Fig. 3 is a side and section of the same spring and clip. Figs. 4 and 5 are cross sectional views of the spring, showing the clip open and slipped over the spring in Fig. 4, and closed and clamped upon the spring in Fig. 5. Fig. 6 is a smaller side view of the clip, and Fig. 7 a side view of the coiled anchoring spring. Fig. 8 is a perspective view of the clip in its normal open state.

In repairing laminated vehicle springs, or in applying protecting or lubricating covers to such springs, it is necessary frequently to remove and replace the clips which embrace the leaves of the springs. Primarily, such clips function to prevent the superposed leaves from separating unduly and from spreading or fanning laterally, and the number of clips used on a given spring varies with the type or length of spring. A common practice is to rivet the clip to one of the leaves of the spring, or to clamp it on the spring by means of a bolt.

The present clip A is especially constructed to be clamped upon a laminated leaf spring B by a bolt or screw C, and preferably, the clip is made of thinner and wider flat steel stock than ordinarily used and portions or sections of the stock cut away or removed from the cross wall or connecting portion 2 of the clip to provide a readily bendable area or flexible web 3 centrally between the side walls 4—4 of the clip. The narrow web portion 3 is relatively short or of less length than the whole connecting portion 2 so that the clip may be folded or bent very readily at its center without much effort. Furthermore, the use of a short neck or web 3 or the removal of only a part of the stock from connecting portion 2 does not weaken the clip immediately adjacent the angular corners 5—5 of the clip but preserves or provides instead relatively wide clamping or embracing areas 6—6 adapted to overlap or cover the border portions of the top or outer leaf 7 of the spring. Obviously the wider areas 6—6 offer greater resistance to bending or folding strains, and folding or bending is localized and more readily effected in web 3. In a full sized clip, the web may be made about one-half of an inch wide and approximately three-quarters of an inch long, to permit the clip to be easily opened and closed by hand, and to be folded or bent frequently without breaking and without distorting any other part of the clip.

In putting the clip on the spring it is spread open and the only part of the stock which is distorted or bent is web 3 where curved on a short radius to place the side walls 4—4 in diverging angular relation, including the inwardly-extending bottom walls 8—8' of the clip and their downwardly-extending flanges 9—9' which are formed with oppositely disposed bolt openings 10—10'. Having a spring with a given number of leaves or a given thickness, the clip is designed when spread open to slip freely over the spring until the curved web portion 3 is at rest centrally upon the top leaf. In this position the bottom walls 8—8' of the clip are inclined upwardly and outwardly in respect to the corner edges of the bottom leaf 11 of the spring so that when the open end of the clip is closed by pressing or drawing the side walls of the clip toward each other it follows that the inclined bottom walls 8—8' may be caused to ride against the corner edges of bottom leaf 11, to draw the sides of the truck downwardly and to flatten the connecting top portion 2. The narrow web 3 fosters such folding movements and prevents the angularly inclined walls of the clip from being unduly distorted when a clamping pressure is applied, and the clip may also be contracted to conform closely to the cross sectional size of the spring, especially at all four angular corners where the clip engages the edges of the top and bottom leaves of the spring.

A bolt or screw C may be used with a nut 12 to draw the clamping ends of the clip together, and I also provide means adapted to connect or anchor the clip to one of the spring leaves to hold or maintain it in a predetermined place or position on the spring, and to prevent loose play or rattling. As shown, the anchoring means consists of a coiled compression spring 14 adapted to be sleeved on screw C so that it may be compressed between the head of the screw and depending flange 9 of the clip, thereby serving to maintain the screw locking connection under tension. Spring 14 is formed with an angular extension or finger 15 which is adapted to pass through the straight branch 16 of key-shaped opening 10 in flange 9, thereby preventing spring 14 from turning or rotating on screw C. The bent extremity of the finger or extension 15 is also thereby placed centrally beneath the bottom leaf 11 of the vehicle spring when the clip is attached to the spring, and this leaf is provided at its free end with a small opening 17 to receive the bent extremity of finger 15, substantially as delineated in Fig. 3. Inasmuch as coiled spring 14 is held against rotation in respect to the clip, the clip is anchored or fixed to the protruding end of leaf 11, which may be the bottom leaf of the vehicle spring, or any one of the leaves when the spring is composed of a plurality of leaves of graduated length as commonly.

In some types of springs, the clip may be slipped over the spring from one side instead of the top, and then turned to bring the buckled connecting portion or web 3 on top of the spring, or below in some cases. The spread portions having the perforated ears or flanges for the clamping bolt or screw may then be drawn together by a pair of pliers preliminary to connecting and tightening the screw.

What I claim, is:

1. A clip for laminated vehicle springs formed from flat stock, having angularly-related side walls and a connecting wall, said connecting wall being of the same width as said side walls at the angular corners therein and of reduced width medially thereof to provide a free flexing portion adapted to permit the clip to be readily buckled to slip over a vehicle spring.

2. A clip for laminated vehicle springs, having angularly related walls adapted to embrace a laminated vehicle spring, a clamping member for said clip adapted to secure the clip to the spring, and a coiled compression spring sleeved on said member having an extension engaging said clip and one of the leaves of the spring.

3. A clip for laminated vehicle springs, having angularly-related walls adapted to enclose a laminated vehicle spring and depending flanges on said walls having bolt openings, one of said openings being of irregular shape, and a clamping member and a locking member extending through said irregularly-shaped opening, said locking member engaging one of the leaves of said spring.

4. A clip for laminated vehicle springs, having a connecting wall of reduced cross section at its middle and straight side walls having inwardly extending portions provided with depending flanges formed with a key opening, in combination with a clamping member for said clip, a coiled spring sleeved on said member having an angular extension projecting through said key opening, and a laminated leaf spring embraced by said clip having one of its leaves formed with an opening adapted to receive said extension.

In testimony whereof I affix my signature.

GEORGE W. CRABTREE.